United States Patent
Moore et al.

(10) Patent No.: US 9,457,824 B2
(45) Date of Patent: Oct. 4, 2016

(54) MOBILE CART FOR SPRAY DISPENSING

(71) Applicant: Black Cat, Inc., Philadelphia, PA (US)

(72) Inventors: Richard I. Moore, Blue Bell, PA (US); Augustus Everhardt, Lansdale, PA (US)

(73) Assignee: Black Cat, Inc., Philadelphia, PA (US)

( * ) Notice: Subject to any disclaimer, the term of this patent is extended or adjusted under 35 U.S.C. 154(b) by 0 days.

(21) Appl. No.: 14/990,227

(22) Filed: Jan. 7, 2016

(65) Prior Publication Data

US 2016/0114823 A1  Apr. 28, 2016

Related U.S. Application Data

(63) Continuation-in-part of application No. 14/596,421, filed on Jan. 14, 2015, now Pat. No. 9,352,763.

(60) Provisional application No. 61/927,282, filed on Jan. 14, 2014.

(51) Int. Cl.
| | |
|---|---|
| *B62B 1/16* | (2006.01) |
| *B62B 1/26* | (2006.01) |
| *B62B 1/12* | (2006.01) |
| *B62B 5/00* | (2006.01) |
| *B62B 1/22* | (2006.01) |

(52) U.S. Cl.
CPC ............... *B62B 1/264* (2013.01); *B62B 1/125* (2013.01); *B62B 1/16* (2013.01); *B62B 1/22* (2013.01); *B62B 5/0003* (2013.01); *B62B 2202/10* (2013.01); *B62B 2203/05* (2013.01)

(58) Field of Classification Search
None
See application file for complete search history.

(56) References Cited

U.S. PATENT DOCUMENTS

| | | | |
|---|---|---|---|
| 515,273 | A | 2/1894 | Becker |
| 1,815,825 | A | 7/1931 | Bates |
| 4,981,412 | A | 1/1991 | Hawkins |
| 5,716,183 | A | 2/1998 | Gibson et al. |
| 6,220,526 | B1 | 4/2001 | Johnson |
| 7,178,695 | B1 | 2/2007 | Malenfant et al. |
| 7,438,084 | B2 | 10/2008 | Trettin et al. |
| 8,061,889 | B2 | 11/2011 | Mattson et al. |
| 8,113,385 | B2 | 2/2012 | Choiniere et al. |

(Continued)

OTHER PUBLICATIONS

Office Action issued May 26, 2016 in U.S. Appl. No. 14/980,698 by Moore.

(Continued)

*Primary Examiner* — John Walters
*Assistant Examiner* — Hilary L Johns
(74) *Attorney, Agent, or Firm* — Panitch Schwarze Belisario & Nadel LLP (57) ABSTRACT

A mobile cart includes a cart frame, a base, wheels rotatably attached to the frame and a cabinet separating the base surface into first and second receiving areas. A first container, containing a first material, and a second container, containing a second material, are positionable in the first and second receiving areas. A first sliding rack and a second sliding rack for securing vessels above the base surface are moveable between stowed positions at least partially within the cabinet and extended positions in the first and second receiving areas, respectively. The cart can alternatively receive one of the first container or first vessel in the first receiving area and one of the second container or second vessel in the second receiving area. A combination mixer and dispenser is releasably secured to the frame and releasably fluidly coupled to the first and second containers and first and second vessels.

20 Claims, 8 Drawing Sheets

(56) References Cited

U.S. PATENT DOCUMENTS

| | | |
|---|---|---|
| 8,132,693 B2 | 3/2012 | Choiniere et al. |
| 8,167,170 B2 | 5/2012 | Choiniere et al. |
| 8,342,372 B2 | 1/2013 | Choiniere et al. |
| 8,474,658 B2 | 7/2013 | Choiniere et al. |
| 8,794,644 B2 | 8/2014 | Chen et al. |
| 2006/0196548 A1 | 9/2006 | Trettin et al. |
| 2007/0045289 A1 | 3/2007 | Kott et al. |

OTHER PUBLICATIONS

Office Action issued Jul. 28, 2016 in U.S. Appl. No. 15/195,359 by Moore.

MOBILE CART FOR SPRAY DISPENSING

CROSS-REFERENCE TO RELATED APPLICATIONS

This application is a continuation-in-part of U.S. patent application Ser. No. 14/596,421, filed on Jan. 14, 2015, entitled "Mobile Cart for Spray Dispensing", which claims priority to U.S. Provisional Patent Application No. 61/927,282, filed on Jan. 14, 2014, entitled "Mobile Cart for Spray Dispensing," the entire contents of which are incorporated by reference herein.

BACKGROUND OF THE INVENTION

Whether replacing an old roof, re-roofing or installing a new roof, a new roofing layer must replace or be applied atop the previously existing outermost roof layer, or a new roofing layer must be laid down for the first time. Doing so generally requires application of a roofing adhesive, such as, for example, a foam adhesive, prior to laying of the roofing layer, in order to secure the roofing layer in place. Also in the roofing industry, a roof typically requires some form of insulation. Insulation is utilized for several reasons, such as, for example, air infiltration control, moisture control, temperature control, and noise reduction. One form of insulation is spray foam insulation. Spray foam insulation is a mixture of components that form an expanding foam upon mixing that is sprayed onto roof tiles, concrete slabs, or the like.

Roofing adhesive and spray foam insulation are generally sold in either a 5 gallon bag-in-a-box, a 15 gallon drum, or a 55 gallon drum. The 15 or 55 gallon drums are preferred to the 5 gallon bag-in-a-box, both from a cost vantage (price per gallon) and because roofing jobs tend to require a large amount of adhesive and insulation. One drawback of the 15 gallon drum however is that it weighs approximately 150 lbs. and the 55 gallon drum weighs even more. Thus, transporting the drums to an upper level, or onto a roof, can be particularly challenging and potentially unsafe. One drawback of the bag-in-a-box is that the contents are usually dispensed from underneath the box via gravity. Thus, any vehicle used to transport the box while in use must provide access to the underside of the box for connection to a dispenser. Traditional carts have openings in the base for the connection to be established but these designs offer limited space for the connection to be made. In addition to transporting the drums or boxes, accompanying equipment, such as, for example, a dispenser, a spray gun, and an air compressor may also be needed.

The present invention addresses the challenges associated with safely transporting roofing adhesive and spray foam insulation and accompanying equipment. For example, it is desirable to provide a mobile cart than can safely receive, carry and transport the necessary equipment for roofing and insulation. Furthermore, it is desirable to provide a mobile cart that positions a box away from the base to provide greater access to the interface between a mixer and the box.

BRIEF SUMMARY OF THE INVENTION

Briefly stated, one aspect of the present invention is directed to a mobile cart including a cart frame, a base coupled to the cart frame, and a plurality of wheels rotatably attached to the cart frame. The base includes a base surface with a cabinet atop the base surface. The cabinet separates the base surface into a first receiving area adjacent the cabinet and a second receiving area adjacent the cabinet opposite the first receiving area. A first container containing a first material is positionable in the first receiving area and a second container containing a second material is positionable in the second receiving area. A first sliding rack is partially positioned above the base surface and moveable between a stowed position at least partially within the cabinet and an extended position in the first receiving area to hold a first vessel away from the base surface when the first sliding rack is in the extended position. A second sliding rack is partially positioned above the base surface and is moveable between a stowed position at least partially within the cabinet and an extended position in the second receiving area to hold a second vessel away from the base surface when the second sliding rack is in the extended position. The first vessel contains the first material and the second vessel contains the second material. A combination mixer and dispenser is releasably secured to the cart frame and has a detachable fluid connection to at least one of the first and second containers and first and second vessels for mixing and dispensing the first and second materials. The first receiving area can alternatively receive one of the first container when the first sliding rack is in the stowed position or the first vessel on top of the first sliding rack when the first sliding rack is in the extended position. The second receiving area can alternatively receive one of the second container when the second sliding rack is in the stowed positions or the second vessel on top of the second sliding rack when the second sliding rack is in the extended position.

Still yet another aspect of the present invention is directed to a mobile cart including a cart frame, a base coupled to the cart frame, and a plurality of wheels rotatably attached to the cart frame. The base includes a base surface and a cabinet separates the base surface into a first receiving area adjacent the cabinet and a second receiving area adjacent the cabinet opposite the first receiving area. A first sliding rack is partially positioned above the base surface and is moveable between a stowed position adjacent the cabinet and an extended position in the first receiving area to hold a first vessel away from the base surface. A second sliding rack is partially positioned above the base surface and is moveable between a stowed position adjacent the cabinet and a second position in the second receiving area to hold a second vessel away from the base surface. A combination mixer and dispenser is releasably secured to the cart frame and has a detachable fluid connection to the first and second vessels above the base surface for mixing and dispensing the first and second materials.

Another aspect of the present invention is directed to a mobile cart including a cart frame, a base coupled to the cart frame, a plurality of wheels rotatably attached to the cart frame, a first container containing a first material, and a second container containing a second material. The base includes a base surface with a cabinet secured to the base surface. The cabinet separates the base surface into a first receiving area adjacent the cabinet and a second receiving area adjacent the cabinet opposite the first receiving area. A first sliding rack is moveable between a stowed position at least partially within the cabinet and an extended position in the first receiving area. A second sliding rack is moveable between a stowed position at least partially within the cabinet and an extended position in the second receiving area. The first sliding rack is adapted to hold a first vessel away from the base surface in the extended position and the second sliding rack is adapted to hold a second vessel away from the base surface in the extended position. A plurality of first receivers are coupled to the base in the first receiving area to hold the first container on the base. A plurality of second receivers are coupled of the base in the second receiving area to hold the second container on the base. A combination mixer and dispenser is releasably secured to the cart frame and has a detachable fluid connection to the first container and the second container for mixing and dispensing the first and second materials. The first container in the first receiving area prevents the first sliding rack from moving into the extended position and the second container in the second receiving area prevents the second sliding rack from moving into the extended position.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings a preferred embodiment of the mobile cart which is presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "right," "left," "lower," and "upper" designate directions in the drawings to which reference is made. The words "inwardly" or "distally" and "outwardly" or "proximally" refer to directions toward and away from, respectively, the geometric center or orientation of the mobile cart and related parts thereof. Unless specifically set forth herein, the terms "a", "an" and "the" are not limited to one element but instead should be read as meaning "at least one". The terminology includes the above-listed words, derivatives thereof and words of similar import.

It should also be understood that the terms "about," "approximately," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
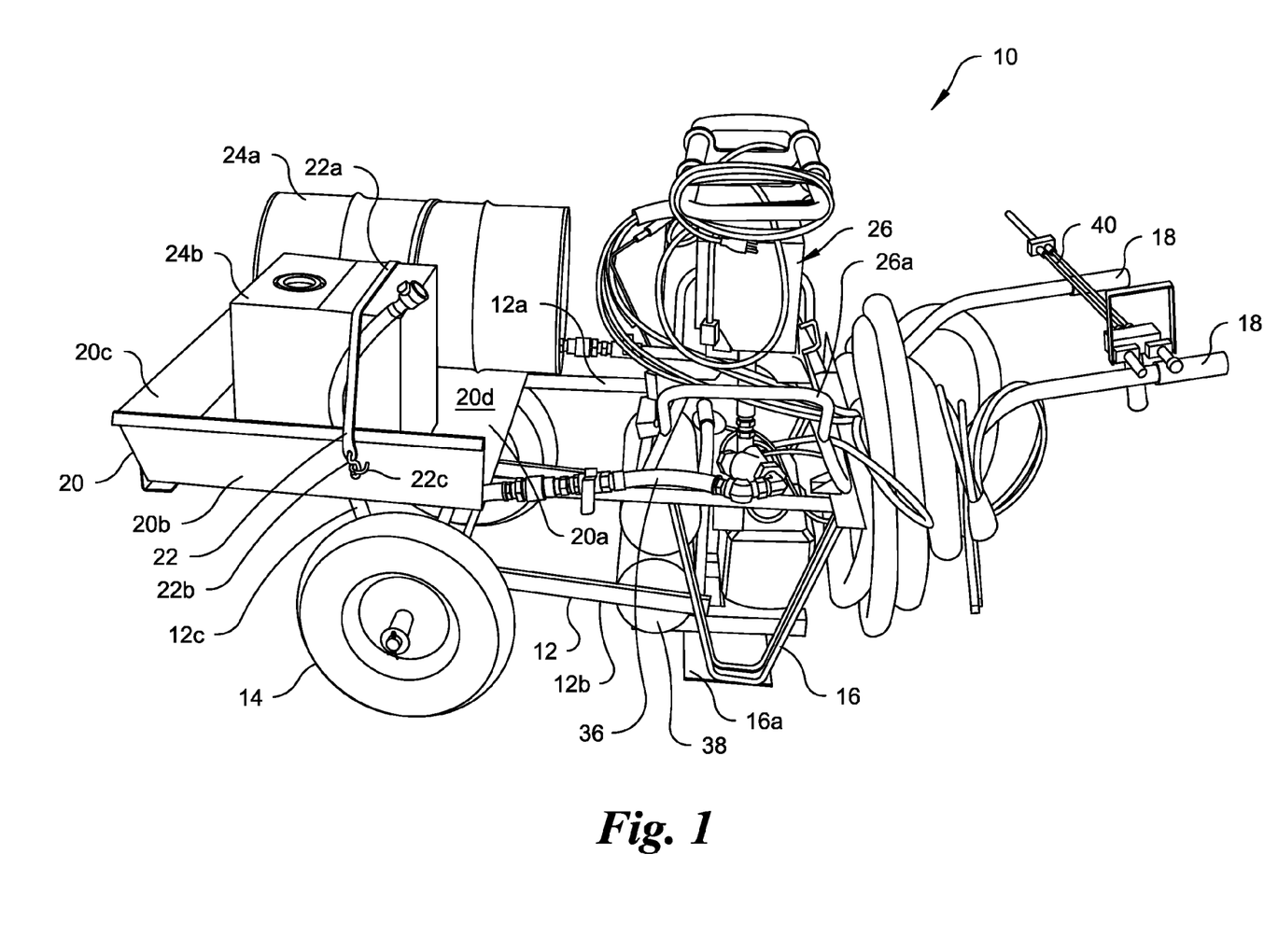
FIG. 1 is a side perspective view of a mobile cart in accordance with one embodiment of the present invention in the horizontal position.

Referring to FIGS. 1-6, the present application is directed to a mobile cart in accordance with one embodiment of the present invention, generally designated with reference numeral 10. As shown in FIG. 1, the cart 10 includes a cart frame 12, a pair of wheels 14 rotatably connected to the frame 12 adjacent a front end thereof, and a pair of cart frame feet 16 adjacent a front end thereof projecting downwardly from the cart frame 12 to the underlying ground surface and dimensioned to support the cart 10 in a generally horizontal position. The cart frame 10 also includes a pair of rearwardly extending cart handles 18 for moving and maneuvering the cart 10, and a carrier tray 20.

Figure 2:
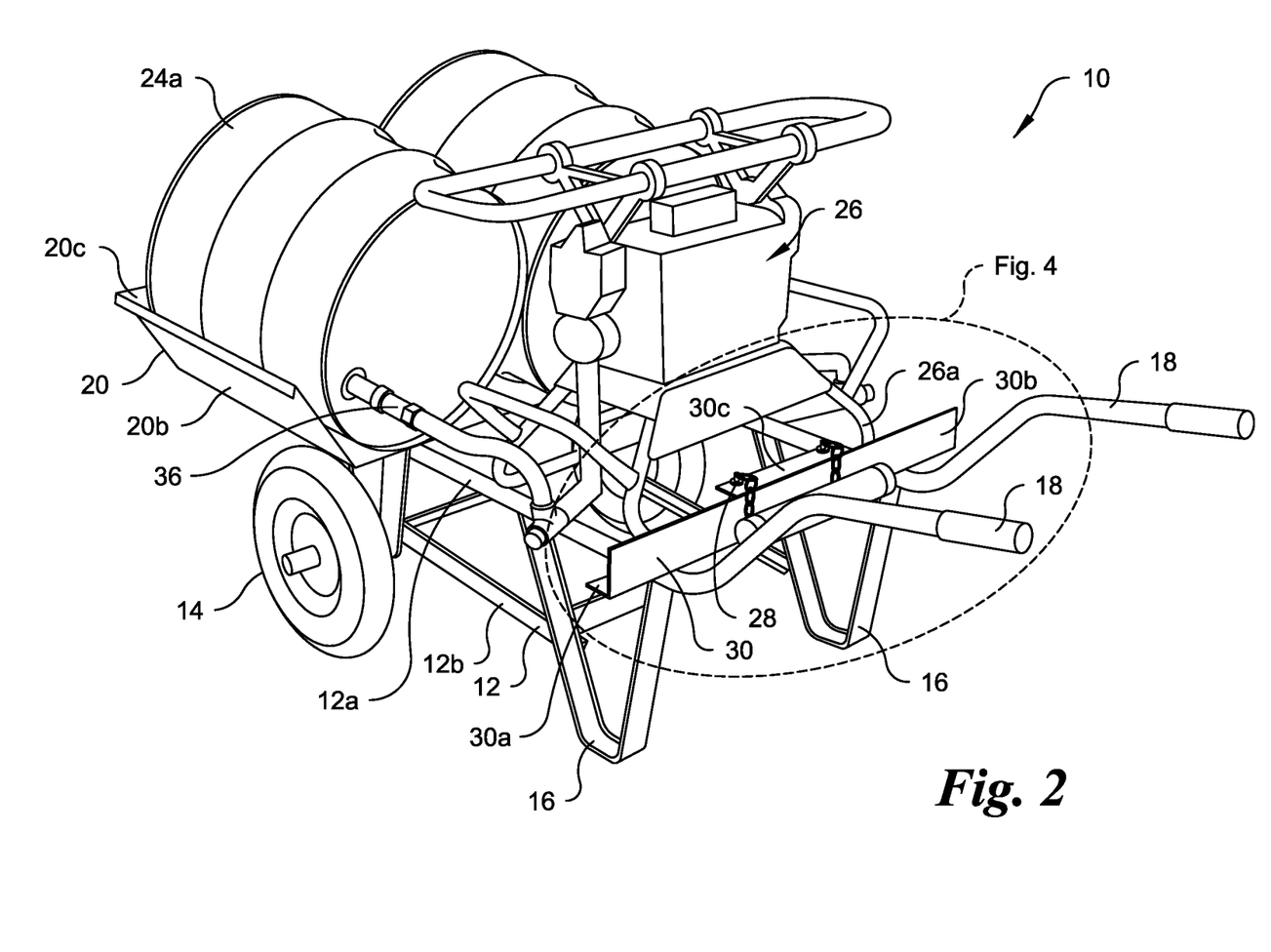
FIG. 2 is a side and rear perspective view of the mobile cart of FIG. 1 in the horizontal position.

Referring now to FIGS. 1 and 2, the cart frame 12 includes a generally rectangular upper cart frame member 12a and a generally rectangular lower cart frame member 12b located beneath the upper cart frame member 12a. That is, the upper and lower cart frame members 12a, 12b constitute substantially parallel left and right side structural bars connected between substantially parallel front and rear structural bars. The upper and lower cart frame members 12a, 12b are spaced apart and fixedly connected together at a front end thereof (the end of the cart 10 supporting the carrier tray 20) via a pair of axial cart frame members 12c extending between respective corners of the rectangular lateral cart frame members 12a, 12b. The wheels 14 are rotatably connected to the front end of the lower cart frame member 12b in a manner well understood by those of ordinary skill in the art.

Figure 3:
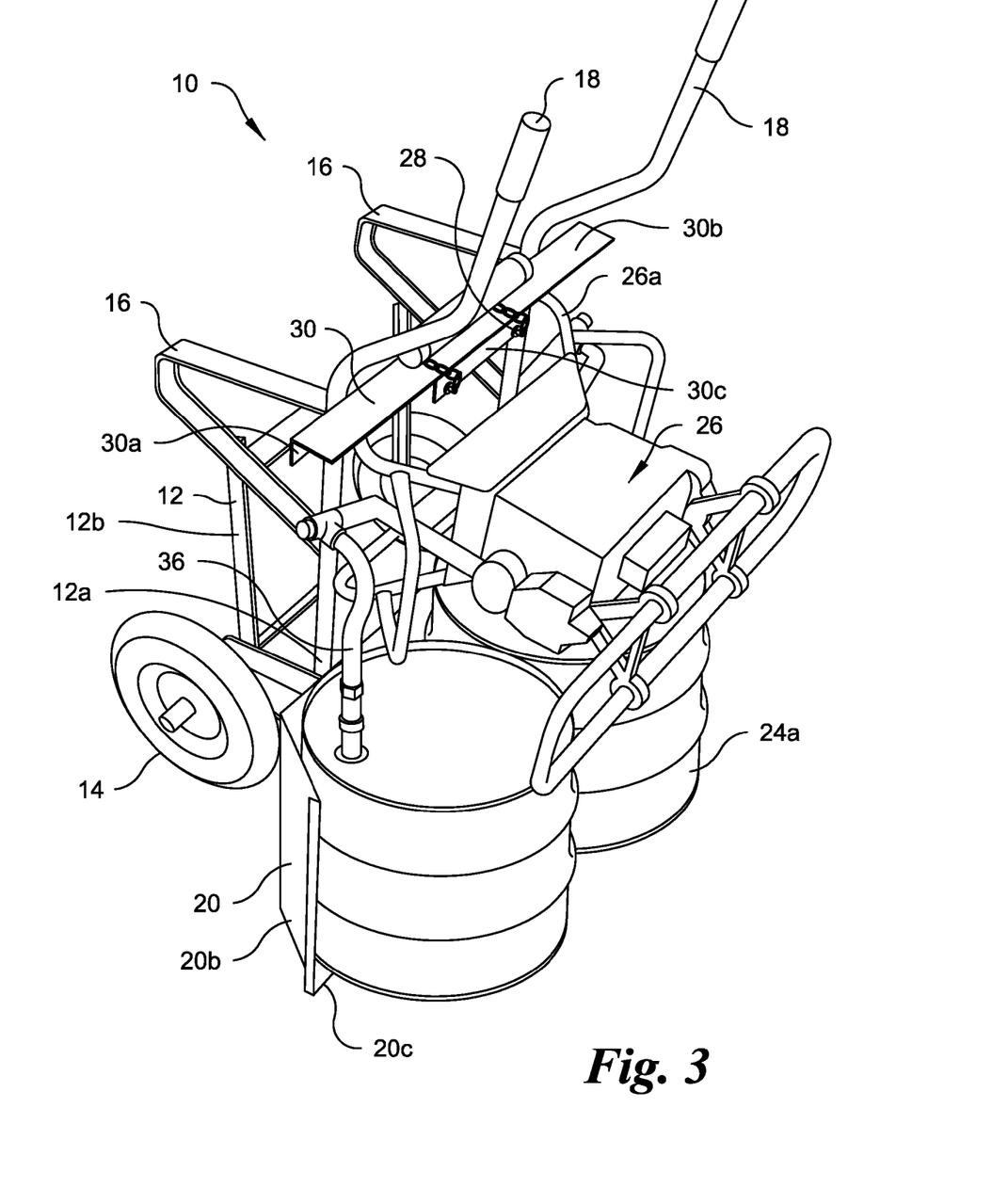
FIG. 3 is a top perspective view of the mobile cart of FIG. 1 in an upright position.

As shown in FIGS. 1 and 2, the cart frame feet 16 extend downwardly from the upper cart frame member 12a to an approximately even elevational level with the bottom of the wheels 14, such that the cart 10 can rest in a substantially horizontal position. The feet 16 are located further rearward along the cart 10 from the wheels 14, adjacent the handles 18. In the illustrated embodiment, the cart frame feet 16 define a generally trapezoidal shape. The upper and longer base of the trapezoidal feet 16 is integrally, i.e., monolithically, formed with, or fixedly secured to, the upper cart frame member 12a. The lower and shorter base of the trapezoidal feet 16 engages the underlying ground surface when the cart 10 is in the horizontal position. In some embodiments, as shown in FIG. 1, and as described further below, the feet 16 include a generally planer support member 16a extending between the lower bases thereof for added stability. The rear of the lower cart frame member 12b left and right side bars are securely connected to the respective feet 16. As shown in FIGS. 2 and 3, the side bars of the upper cart frame member 12a extend rearwardly to form the handles 18.

As shown in FIGS. 1-3, the carrier tray 20 is fixedly secured atop, and supported by, the front end of the upper cart frame 12a. The carrier tray 20 defines a generally planar tray base 20a, two side walls 20b extending upwardly from the sides of the tray base 20a, and a front wall 20c extending upwardly from the front end of the tray base 20a and extending between the side walls 20b. The tray base 20a, and walls 20b, 20c, define a cavity 20d therebetween for supporting materials thereon. As shown in FIG. 1, the side walls 20b and the front wall 20c extend from the tray base 20a at a slightly obtuse angle. However, as should be recognized by those of ordinary skill in the art, the walls 20b, 20c may extend substantially perpendicularly to the tray base 20a. The carrier tray 20 has open upper and rear ends.

The carrier tray 20 is dimensioned to support drums 24a and/or boxes 24b in the cavity 20d, such as, for example, a 15 or 55 gallon drum and a 5 gallon bag-in-a-box containing different materials, e.g., adhesive or spray foam insulation. The carrier tray 20 is dimensioned to support two 15 or 55 gallon drums 24a, placed side-by-side in the tray 20, as shown in FIGS. 2 and 3. Alternatively, the carrier tray 20 can support one 15 or 55 gallon drum 24a and one 5 gallon bag-in-a-box 24b placed side-by-side in the tray 20, as shown in FIG. 1. Alternatively, the carrier tray 20 can support two 5 gallon bag-in-a-boxes 24b placed side-by-side in the tray 20 (not shown). Once loaded onto the carrier tray 20, both a drum 24a or box 24b can be secured in place via securing means 22 (FIG. 1). In the illustrated embodiment, the securing means 22 comprises an elastic band 22a having hooks 22b for strapping around the drum 24a or box 24b and hooking into opposing hooks 22c projecting from the sidewalls 20b (FIG. 1) and from the tray base 20a (not shown). As should be understood, the elastic band 22a is configured to tightly strap around either a box 24b or a drum 24a to substantially prevent it from moving. As also should be understood, the elastic band 22a is configured to not rip or tear from the force imparted thereon by the box 24b or drum 24a. As also should be understood by those of ordinary skill in the art, any of numerous different securing means, currently known or that later become known and capable of performing the function of the securing means as described herein, may be utilized.

In order to safely and easily load a drum 24a onto the carrier tray 20, the cart 10 is tillable between a generally horizontal "use" or "carry" position (FIGS. 1 and 2) and a generally vertical "loading" position (FIG. 3). That is, a user can hold the handles 18 (and the feet 16 as well if preferred) and tilt the cart 10 onto the front wall 20c of the carrier tray such that the front wall 20c lies substantially flat onto the underlying surface. In the vertical position, a standing vertical drum 24a may be pushed to slide over the front wall 20c and rest against the tray base 20a. The slightly obtuse angle between the front wall 20c and the tray base 20a allows the front wall 20c to act as a ramp for sliding the drum 24a thereon. The angle also mitigates tipping over of the cart 10 in the vertical position, and substantially stabilizes the cart 10 to remain in the vertical position unassisted. Then the securing means 22 is engaged to secure the vertical drum 24a in place.

If a user wishes to load two drums 24a, a second drum 24a may be placed in the carrier tray 20 in the same manner. Then the cart 10 may be tilted back to the horizontal position for transporting and/or using the drum 24a. Thereafter, a user may lift the cart 10 from the handles 18 enough to distance the feet 16 from the underlying ground surface while the rear wheels 14 remain on the ground surface, such that a user may pull or push the cart 10. A box 24b may be loaded in the same manner. However, as a box 24b is lighter, a box 24b may simply be picked up and placed into the carrier tray 20 while the cart 10 is in the horizontal position. One advantage of tilting the cart 10 into a vertical position is that a drum 24a, such as a 150 lb. adhesive drum, can simply be pushed into the carrier tray 20. This avoids the safety hazard associated with lifting and placing a heavy object into the carrier tray 20. This also avoids the need for utilizing machinery to lift the drum and place it in the cart 10. Once loaded onto the cart 10, one advantage of the cart 10 is an easier transportation of the drum 24a and/or box 24b to an upper level of a structure or the roof thereof.

The cart 10 is also configured to releasably carry and transport a portable mixer and dispenser 26. The dispenser 26 is fluidly coupled to the drum 24a and/or the box 24b, and is necessary for properly dispensing the contents therein. For example, without limitation, the dispenser 26 may be a Reactor E-8p portable electric foam sprayer sold by Graco Inc.

Figure 4:
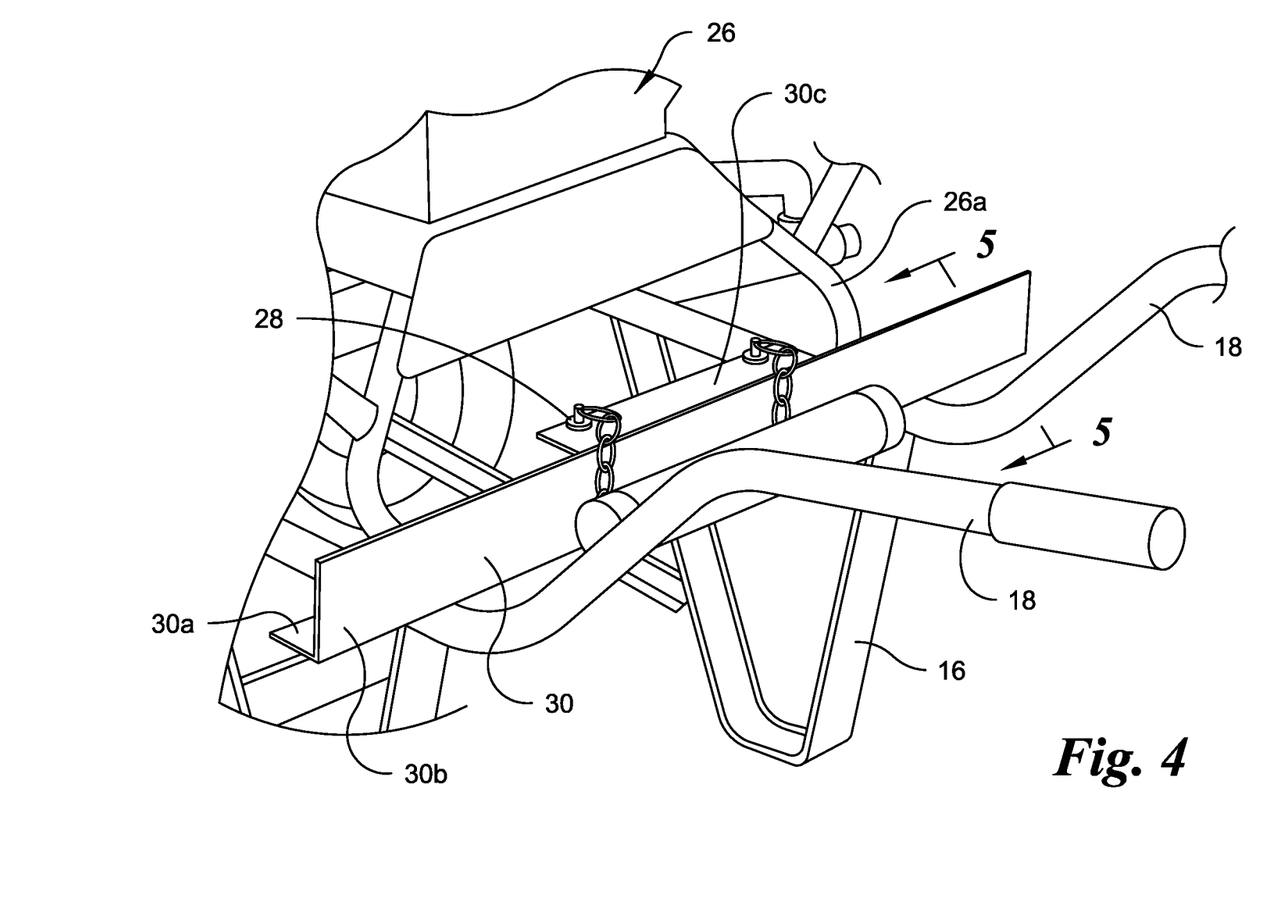
FIG. 4 is a greatly enlarged fragmentary perspective view of the mobile cart of FIG. 1, showing a quick connection between the dispenser frame and the cart frame.

As shown in FIGS. 1-3, the portable dispenser 26 is mountable atop, and supported by, the upper cart frame member 12a, adjacent the handles 18. The distance between the sidewalls of the upper cart frame member 12a is dimensioned to be shorter than the length of a standard portable tubular dispenser frame 26a. Thus a portable dispenser 26, having a tubular dispenser frame 26a is mountable across the upper cart frame member 12a, as shown best in FIG. 2. The portable dispenser 26 is releasably securable to the frame member 12a via a quick connect 28. As shown in FIG. 4, an L-shaped bracket 30 extends across, and is secured to, the left and right side bars of the upper cart frame member 12a, adjacent the handles 18. The base member 30a of the bracket 30 lays flat on the frame member 12a, and the side member 30b of the bracket 30 projects generally perpendicularly upwardly from the base member 30a. The bracket 30 also includes an approximately central top flange 30c, extending from the top of the side member 30b, parallel to the base member 30a.

Figure 5:
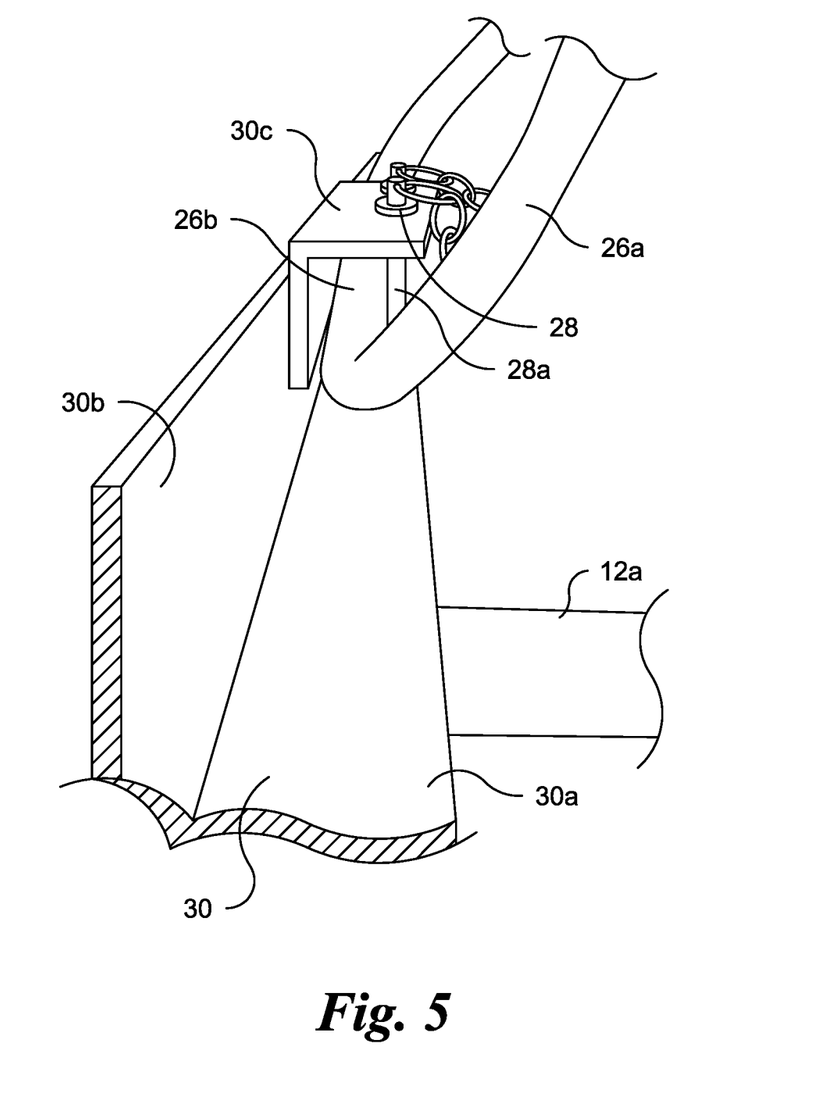
FIG. 5 is a greatly enlarged cross-sectional view of the quick connection between the dispenser frame and the cart frame taken along line 5-5 of FIG. 4.
Figure 6:
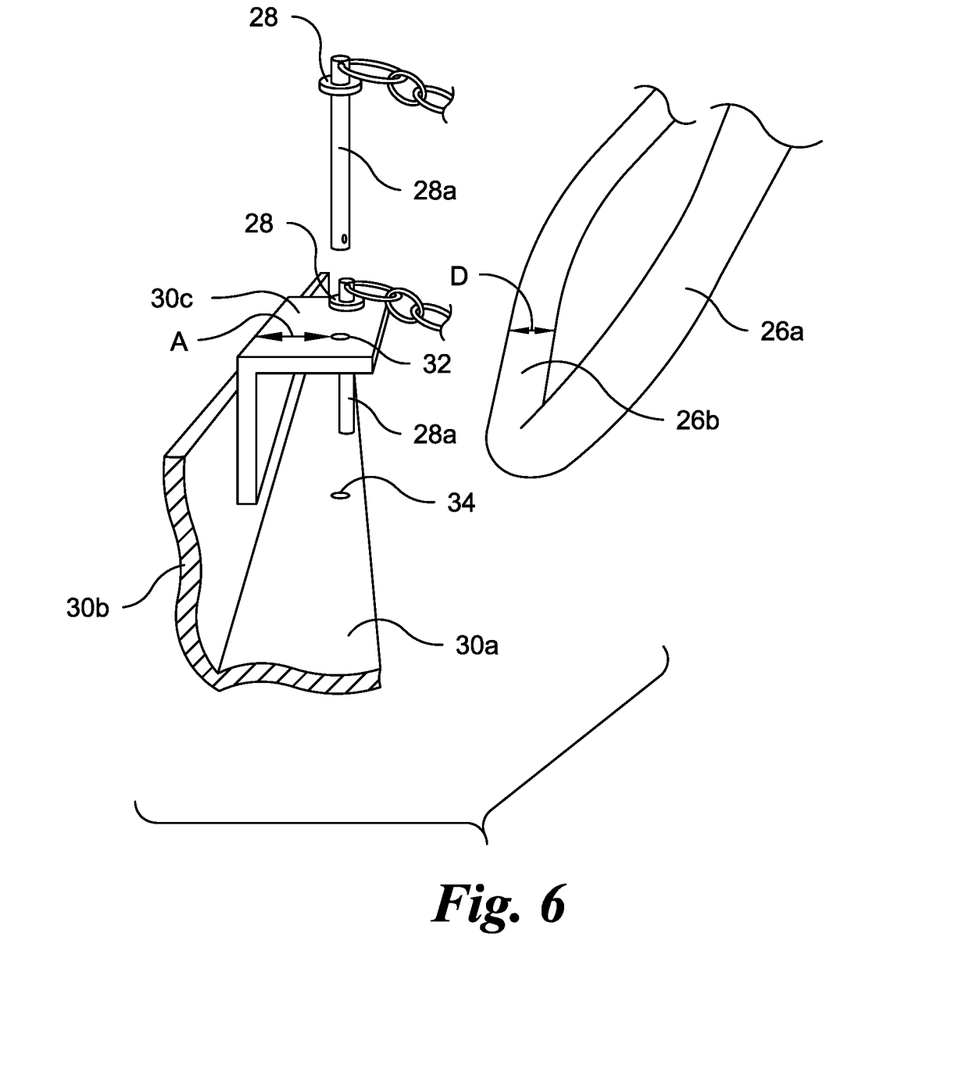
FIG. 6 is a greatly enlarged cross-sectional exploded perspective view of the quick connection between the dispenser frame and the cart frame taken along line 5-5 of FIG. 4.

As shown in FIG. 6, the top flange 30c includes at least one aperture 32 therein. In the illustrated embodiment, the top flange 30c includes two upper apertures 32 laterally spaced from one another. However, as should be understood, the flange 30c may include more than two apertures. The base member 30a of the bracket 30 also includes a corresponding number of lower apertures 34, vertically aligned with the respective upper apertures 32. In the illustrated embodiment, as shown in FIGS. 5 and 6, the quick connect 28 includes a corresponding number of detent pins 28a as there are upper apertures 32.

As shown in FIG. 5, the dispenser 26 is rested atop the frame member 12a such that a side bar 26b of the dispenser frame 26a extends along the base member 30a of the bracket 30. The side member 30b of the bracket 30 prevents the dispenser 26 from sliding rearward (i.e., toward the handles 18). The upper and lower apertures 32 and 34 are positioned along the flange 30c and the base member 30a, respectively, such that the distance A between the upper and lower apertures 32, 34 and the side member 30b of the bracket 30 is greater than the diameter D of the tubular dispenser frame (FIG. 6). Thus, when the side bar 26b of the dispenser frame 26a is rested against the side member 30b of the bracket 30, the detents pins 28a can be projected through the upper apertures 32, clear the dispenser frame 26a, and continue through the corresponding lower apertures 34. The dispenser frame 26 is then attached/connected to the cart 10. Alternatively, the side bar 26b of the dispenser frame 26a may also include corresponding apertures, such that the detent pins 28a extend through the side bar 26b as well. As should be understood by those of ordinary skill in the art, a ball and detent in the respective pins 28a prevents the pins 28a from inadvertently slipping out of the upper and lower apertures 32 and 34.

To detach/disconnect the dispenser 26 from the cart 10, the pins 28a are manually removable from the upper and lower apertures 32, 34. As should be understood by those of ordinary skill in the art, however, any of numerous different quick connect and disconnect means, capable of performing the quick connection and disconnection of the dispenser 26 to and from the cart 10 as described herein, may be utilized. For example, any of numerous different locking members may be utilized to lock and unlock the dispenser frame 26*a* into and from the bracket 30 or other parts of the upper frame 12*a*.

Referring now to FIGS. 2 and 3, as should be understood by those of ordinary skill in the art, the dispenser 26 includes standard connections 36 for connecting the dispenser 26 to both drums 24*a* or boxes 24*b* (FIGS. 1-3). As also should be understood, the contents in the drums 24*a* and/or the boxes 24*b* are gravity fed through the connection lines and into the dispenser 26 due to the internal gravimetric pressure within the drums and/or boxes.

In use, the dispenser 26 can be carried and transported by the cart 10, along with the drums 24*a* and/or boxes 24*b*, to a work site. A user typically leaves the dispenser 26 on the cart 10 while dispensing the contents from the drum 24*a* and/or box 24*b* through the dispenser 26. Alternatively, if desired or required, a user may quickly disconnect and remove the dispenser 26 from the cart 10. After completing a job, a user may reconnect the dispenser 26 to the cart 10 for easy transportation thereof.

For some applications, an air compressor 38 is beneficial in conjunction with the dispenser 26. Thus, in some embodiments, the cart 10 further includes an air compressor 38 located beneath the dispenser 26, secured atop the planar support member 16*a* between the feet 16 (only shown in FIG. 1). The air compressor 38 is fluidly connectable to the dispenser 26 in a manner well understood by those of ordinary skill in the art. When an air compressor 38 is used, an air purge type of mixing gun (not shown) is used to mix the two ingredients with air. For some applications, such as, for example, to spray adhesive from the dispenser 26, a static mixing gun is required. Accordingly, in some embodiments, the cart 10 further includes a mixing gun 40 fluidly connected to the dispenser 26 (FIG. 1).

Figure 7:
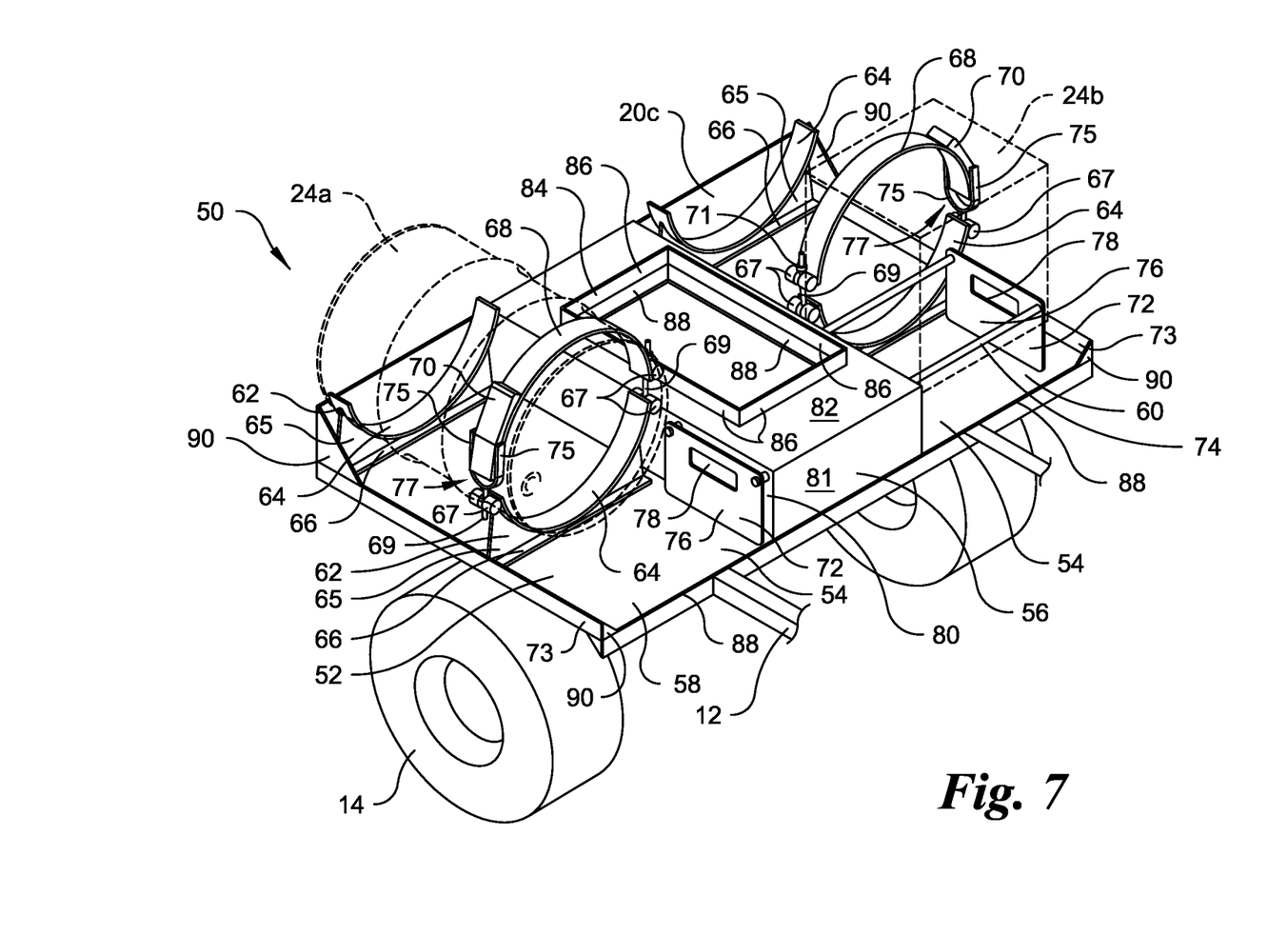
FIG. 7 is a fragmentary perspective view of a front portion of a mobile cart in accordance with another embodiment of the present invention in a horizontal position.
Figure 8:
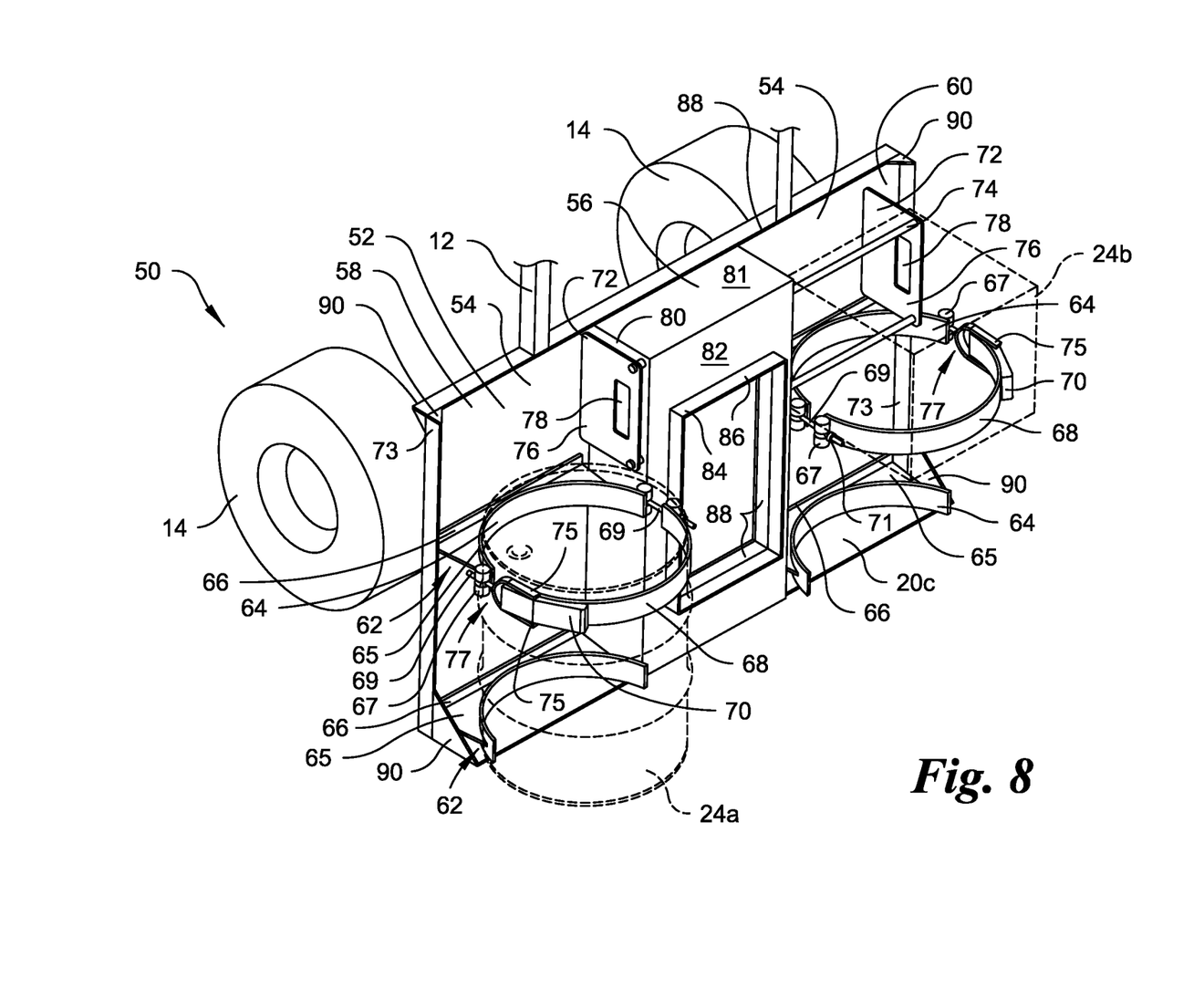
FIG. 8 is a fragmentary perspective view of the front portion of the mobile cart of FIG. 7 in an upright position.

Another embodiment of a mobile cart in accordance with the present invention generally designated with reference numeral 50 is shown in FIGS. 7-8 wherein like reference numerals are used to refer to elements previously described in connection with FIGS. 1-6. Only the front section of cart 50 is shown and described with reference to FIGS. 7-8. The cart 50 has a rear section (not shown) which includes handles, legs, and a portable mixer and dispenser attached to the frame as previously described. As shown in FIG. 7, the cart 50 includes a base 52 and a pair of wheels 14 rotatably attached to the frame 12. The base 52 has a planar base surface 54 which is generally horizontal with respect to a support surface beneath the wheels 14 when the cart 50 is in the horizontal orientation as shown in FIG. 7.

The cart 50 includes a first receiving area 58 separated from a second receiving area 60 by a cabinet 56 which sits atop the base surface 54 and is attached to the base 52 by welding or other conventional fasteners (not shown). The first and second receiving areas 58, 60 are on opposing sides of the cabinet 56 and are substantially similar to each other in that both receiving areas are dimensioned to receive containers or drums 24*a* (e.g. a 15 gallon drum, a 55 gallon drum) and/or vessels or boxes 24*b* (e.g. a 5 gallon bag-in-a-box). Therefore, any description of either the first receiving area 58 or the second receiving area 60 also applies to the other of the first and second receiving areas 58, 60. The cabinet 56, front wall 20*c*, edge 73, and base rear 88 form the boundaries of the first and second receiving areas 58, 60. The edge 73 extends upwardly away from, and along a side of, the base surface 54. Reinforcing returns 90 are coupled to, and extend generally perpendicularly from, the front wall 20*c* and edge 73 by conventional methods (e.g. by welding) to provide additional strength and rigidity to the front wall 20*c* and edge 73. The return 90 connected to the edge 73 is coupled to the base 52 along the base rear 88 by welding or other conventional fasteners (not shown). The returns 90 connected to the front wall 20*c* are coupled to the edge 73 by similar connection methods (not shown).

The first and second receiving areas 58, 60 each include a sliding rack 72 which is moveable along an axis generally parallel to the base surface 54 to move between a stowed position and an extended position. The sliding rack 72 in the first receiving area 58 is shown in the stowed position while the sliding rack 72 in the second receiving area 60 is shown in the extended position. Alternatively, the cart can have both sliding racks in either of the extended or stowed positions. The sliding rack 72 of each of the first and second receiving areas 58, 60 can be moved between the extended and stowed positions independently of one another. Each sliding rack 72 includes a pair of rods 74 supported by a panel 76 such that the rods are positioned above the base surface 54. The rods 74 are therefore preferably made from a material that is sufficiently rigid to support the box 24*b* (e.g. metal). The panel 76 and rods 74 can be monolithically formed such that the sliding rack 72 is a single element. Alternatively, the panel 76 can be manufactured separately from, and connected to, the rods 74 (e.g. by welding, adhesive, press fit). The panel 76 extends upwardly from, and is slideably moveable with respect to, the base surface 54. A lower portion of the panel 76 is in contact with base surface 54 at least when the sliding rack 72 is in the extended position to maintain the position of the rods 74 above the base surface. The box 24*b* (shown in phantom in FIGS. 7-8) on top of the rods 74 is thus positioned away from the base surface 54. One advantage of securing the box 24*b* above the base surface 54 is that any leakage of fluid at the connection interface between the mixer and box would fall to the base surface rather than the roof or support surface under the wheels. Another advantage is the space between the base surface 54 and box 24*b* provides greater access to establish the connection between the box 24*b* and mixer 26. As should be recognized by those of ordinary skill in the art, the rods 74 could contact the base surface 54 as long as the box 24*b* on top of the rods is positioned away from the base surface. The securing means (not shown in FIGS. 7-8) described in connection with the previous embodiment can also be used to secure the box 24*b* to the sliding rack 72, see FIG. 1. The edge 73 can prevent over-extension of the sliding rack 72 by blocking movement of the panel 76 away from the cabinet 56 beyond the boundary of the receiving area 58, 60.

The panel 76 includes a graspable handle 78 such that a user can manually transition the sliding rack 72 between the stowed and extended positions. The panel 76 is adjacent the cabinet 56 when the sliding rack 72 is in the stowed position or is at least closer to the cabinet in the stowed position than in the extended position. The cabinet includes sidewalls 80, a front wall 81, and a rear wall (not shown but identical to the front wall 81) extending away from the base surface 54. The sidewalls 80, front wall 81, and rear wall are connected by a top wall 82 by conventional methods and together they define a cavity within the cabinet for receiving at least a portion, and more preferably a majority portion, of the rods 74 through holes in the sidewall 80 when the sliding rack 72 is in the stowed position. The through holes can include a gasket (or have sufficiently tight tolerances with the outer diameter of the rod) to allow the rods 74 to move into and out of the holes when a sufficient force is applied but prevents the sliding rack 72 from unintended movement when loading and unloading a box 24b onto the top of the sliding rack 72. The cart 50 can receive a first box 24b containing a first material therein on top of the sliding rack 72 in the first receiving area 58 and a second box (not shown but identical to the first box 24b) containing a second material therein on top of the sliding rack 72 in the second receiving area 60 when both sliding racks 72 are in the extended positions.

A tray 84 is connected to the top wall 82 of the cabinet 56 which can hold additional equipment or spare boxes (not shown but identical to box 24b). The tray 84 is formed by partitions 86 connected to each other by conventional methods such as welding and which extend upwardly from the top wall 82. Plates 88 extend from the partitions 86 parallel to the top wall 82 to connect the tray 84 to the cabinet 56 by conventional connection methods (not shown but could be bolts, rivets, welding, etc.). As should be understood by one of ordinary skill in the art, the distance between the top wall 82 and the top of the partition 86 can be adjusted to create a deeper or shallower tray 84 as desired. It may be desirable to have a deeper tray 84 to receive hand tools which are used during the roofing installation process. Alternatively, it may be desirable to have a shallower tray 84 for easier loading of additional spare boxes 24b in the tray 84. Although the tray 84 is shown as having a rectangular shape, any configuration could be adopted.

The first receiving area 58 includes at least one receiver 62 adapted to support the container or drum 24a (shown in phantom in FIGS. 7-8). The receiver 62 includes a top piece 64 and a bottom flange 66 connected to each other by webbing 65. The bottom flange 66 is a flat metal strip coupled to the base 52 by conventional methods (e.g. welding, adhesive, screw, nut and bolt). The top piece 64 is a metal strip similar to the bottom flange 66 but has a semi-circular shape which follows the outer contour of at least a portion of the drum 24a. The webbing 65 extends upwardly from the bottom flange 66 and supports the top piece 64. The webbing 65 is connected to the bottom flange 66 and top piece 64 by conventional connection methods (e.g., welding) but the receiver 62 could also be formed monolithically. The top piece 64 and bottom flange 66 are preferably wider than the webbing 65 to diffuse any forces on the drum 24a and base 52 while minimizing the material used to create the receiver 62. FIG. 7 shows two receivers 62 in the first receiving area 58 but any number of receivers 62 can be used. One of the receivers 62 in the first receiving area 58 includes a receptacle 67 attached to each end of the top piece 64 (by welding, adhesive, etc.) to couple a locking arm 68 to the receiver 62 as explained below. Alternatively, all of the receivers 62 could include the receptacles 67, if desired. As should be understood by one of ordinary skill in the art, the top piece could also have any desired shape to receive a differently shaped container than that shown here.

The locking arm 68 is coupled to one of the receivers 62 in the first receiving area 58 to secure the drum 24a to the receivers 62 as well as acting as a backstop to prevent movement of the box 24b on the sliding rack 72 in at least one direction toward the front wall 20c (best seen in the second receiving area 60). The locking arm 68 can be a flexible metal band which can adapt to the shape of the drum 24a to secure the container in place. Alternatively, the locking arm 68 can be elastic, rubber, or the like provided it is configured to tightly strap around the container and not to fail from the forces imparted thereon by the drum 24a. The locking arm 68 includes a receptacle 67 on one end which is aligned with and opposite to one of the receptacles 67 on the receiver 62. The receivers 67 each include a through hole to receive a threaded rod 69. A nut 71 is threaded onto the threaded rod 69 above the receptacle 67 on the locking arm 68 and below the receptacle 67 on the top piece 64 to secure one side of the locking arm 68 and receiver 62 to each other. One advantage of using a threaded rod 69 and nuts 71 is that it provides some adjustability of the distance between at least one side of the locking arm 68 and the receiver 62 when the nut 71 is rotated. As should be understood by an ordinary artisan, one or more of the through holes could be threaded to engage the threaded rod 69 such that a nut 71 is not required. The other end of the locking arm 68 includes a buckle 70 which is used to relatively quickly transition the locking arm 68 between a locked configuration where the drum 24a is secured to the receivers 62 and an unlocked configuration where the container can be inserted on or removed from the receivers 62. The buckle 70 is rotatable about an axle (not shown) extending between the arms 75 of a U-shaped connector 77 (although any equivalent connecter could be used). A threaded rod 69 extends from the bottom of the connector 77 and extends through the through hole in the receptacle 67. A nut (not shown but identical to nut 71) is threaded on the threaded rod 69 below the receptacle 67. The nut can be rotated to adjust the distance between the locking arm 68 and receiver 62. The buckle 70 includes a cam or similar mechanism such that rotation of the buckle 70 about the axle causes the locking arm 68 to bear against at least a portion of the drum 24a and secures the drum 24a to the receiver 62. Alternatively, the buckle 70 may have a detachable connection with one of the locking arm 68 or connector 77 to allow the locking arm 68 to be moved such that it does not interfere with loading and unloading of the drum 24a on the receiver 62. Of course, any type of equivalent securing mechanism could be adopted in place of the buckle 70 as should be understood by one of ordinary skill in the art (e.g. a catch, hasp, latch). One advantage of having a receiver 62 and locking arm 68 which extend along a portion of the sides of the drum 24a is that the cart 50 can have a relatively short edge 73 because the edge 73 is not required to prevent lateral movement of the drum 24a. Alternatively, a taller edge 73 could still be used as a backup to the receiver 62 and locking arm 68 in case of failure. A drum 24a on the receiver 62 in either receiving area 58, 60 prevents the sliding rack 72 being moved from the stowed to the extended position. The sliding rack 72 in the extended position prevents a drum 24a from being fully seated in the receiving area 58, 60. Thus, the cart 50 can alternatively receive in each of the first and second receiving areas 58, 60 one of either the drum 24a when the sliding rack 72 is in the stowed position or the box 24b on top of the sliding rack 72 when the sliding rack 72 is in the extended position. The drum 24a or box 24b in the first receiving 58 area contains a first material while the drum 24a or box 24b in the second receiving 60 area contains a second material which may be different from the first material.

The cart 50 is tiltable between a horizontal orientation (FIG. 7) and a vertical orientation (FIG. 8). The front wall 20c extends upwardly from the base 52 at a slightly obtuse angle as previously described in reference to other embodiments to aid in loading the drums 24a when the cart is in the vertical orientation. The cart 50 is also configured to releasably carry and transport a portable mixer and dispenser as previously described. The mixer can mix and dispense the first and second materials from any combination of drums 24a or boxes 24b as desired.

In use, the cart 50 transports the drums 24a and/or boxes 24b to a work site. A user typically elects to position a drum 24a in each of the first and second receiving areas 58, 60 for larger jobs or a box 24b in each of the first and second receiving areas 58, 60 for smaller jobs. A user can disconnect and remove the drum 24a from the receiver 62 during in the course of performing a job, move the sliding rack 72 into the extended position, and position a box 24b on top of the sliding rack 72 or move the sliding rack 72 into the stowed position to place a drum 24a in the receiving area 58, 60. A user can easily couple or decouple the fluid connection between the box 24b and mixer 26 in the space between the base surface 54 and rods 74. After completion of the job, the user can transport all of the materials away with the cart.

Although the cart has been described in connection with roofing applications, it should be understood by one of ordinary skill in the art that the cart can be used for any desired purpose where containers need to be transported and/or mixed. One non-limiting example of an alternate use for the cart is for transporting and installing spray insulation in homes or buildings.

It will be appreciated by those skilled in the art that changes could be made to the embodiments described above without departing from the broad inventive concept thereof. It is understood, therefore, that this invention is not limited to the particular embodiment disclosed, but is intended to cover modifications within the spirit and scope of the present invention as defined by the appended claims.

We claim:

1. A mobile cart comprising:
a cart frame;
a base including a base surface, the base coupled to the cart frame;
a plurality of wheels rotatably attached to the cart frame;
a cabinet atop the base surface, the cabinet separating the base surface into a first receiving area adjacent the cabinet and a second receiving area adjacent the cabinet opposite the first receiving area;
a first container positionable in the first receiving area, the first container containing a first material;
a first sliding rack partially positioned above the base surface and moveable between a stowed position at least partially within the cabinet and an extended position in the first receiving area to hold a first vessel away from the base surface in the extended position, the first vessel containing the first material;
a second container positionable in the second receiving area, the second container containing a second material;
a second sliding rack partially positioned above the base surface and moveable between a stowed position at least partially within the cabinet and an extended position in the second receiving area to hold a second vessel away from the base surface in the extended position, the second vessel containing the second material; and
a combination mixer and dispenser releasably secured to the cart frame and having a detachable fluid connection to at least one of the first and second containers and first and second vessels for mixing and dispensing the first and second materials;
wherein the first receiving area can alternatively receive one of the first container when the first sliding rack is in the stowed position or the first vessel on top of the first sliding rack when the first sliding rack is in the extended position;
wherein the second receiving area can alternatively receive one of the second container when the second sliding rack is in the stowed position or the second vessel on top of the second sliding rack when the second sliding rack is in the extended position.

2. The mobile cart of claim 1, further comprising a plurality of first receivers coupled to the base in the first receiving area to hold a first container secure to the base surface.

3. The mobile cart of claim 2, further comprising a plurality of second receivers coupled to the base in the second receiving area to hold a second container secure to the base.

4. The mobile cart of claim 3, further comprising:
a first locking arm coupled to one of the plurality of first receivers, the first locking arm transferable between a locked configuration and an unlocked configuration to releasably secure the first container to the plurality of first receivers; and
a second locking arm coupled to one of the plurality of second receivers, the second locking arm transferable between a locked configuration and an unlocked configuration to releasably secure the second container to the plurality of second receivers.

5. The mobile cart of claim 4, further comprising
a first buckle coupled to the first locking arm to transfer the first locking arm between the locked configuration and the unlocked configuration; and
a second buckle coupled to the second locking arm to transfer the second locking arm between the locked configuration and the unlocked configuration.

6. The mobile cart of claim 1, wherein the first and second containers comprise a cylindrical drum and the first and second vessels comprise a bag-in-a-box.

7. The mobile cart of claim 1, wherein at least one of the first sliding rack and the second sliding rack are moveable along an axis generally parallel to the base surface to move between the stowed position and the extended position.

8. The mobile cart of claim 1, wherein the cart is tillable to transition the base surface between a generally horizontal orientation and a generally vertical orientation with respect to a support surface beneath the plurality of wheels.

9. The mobile cart of claim 1, wherein the first sliding rack includes a first pair of rods coupled to a first plate, the first plate in contact with the base surface to hold the first pair of rods away from the base surface; and
wherein the second sliding rack includes a second pair of rods coupled to a second plate, the second plate in contact with the base surface to hold the second pair of rods away from the base surface.

10. The mobile cart of claim 9, wherein at least one of the first plate and the second plate include a graspable handle to manually move the first sliding rack and the second sliding rack between the stowed position and extended position.

11. The mobile cart of claim 9, wherein the cabinet includes a cabinet cavity defined by first and second sidewalls extending upwardly from the base surface and a top wall connected to the first and second sidewalls; and
wherein a majority of at least one of the first pair of rods and second pair of rods is within the cabinet cavity when the first and second sliding racks are in the stowed position.

12. A mobile cart comprising:
a cart frame;
a base including a base surface, the base coupled to the cart frame;
a plurality of wheels rotatably attached to the cart frame;

a cabinet which separates the base surface into a first receiving area adjacent the cabinet and a second receiving area adjacent the cabinet opposite the first receiving area;

a first sliding rack partially positioned above the base surface and moveable between a stowed position adjacent the cabinet and an extended position in the first receiving area to hold a first vessel away from the base surface;

a second sliding rack partially positioned above the base surface and moveable between a stowed position adjacent the cabinet and a second position in the second receiving area to hold a second vessel away from the base surface; and a combination mixer and dispenser releasably secured to the cart frame and having a detachable fluid connection to the first and second vessels above the base surface for mixing and dispensing the first and second materials.

13. The mobile cart of claim 12, wherein the first sliding rack includes:
a first pair of rods at least a portion of which are moved into and out of the cabinet when the first panel is moved between the stowed position and extended position; and
a first panel coupled to the first pair of rods which holds the first pair of rods away from the base surface;
wherein the first sliding rack holds the first vessel atop the first pair of rods.

14. The mobile cart of claim 13, wherein the first panel includes a graspable handle to manually move the first sliding rack between the stowed configuration and the extended configuration.

15. The mobile cart of claim 12, wherein the first vessel contains a first material and the second vessel contains a second material different from the first material.

16. The mobile cart of claim 12, wherein at least one of the first and second vessels comprise a bag-in-a-box.

17. The mobile cart of claim 13, wherein the cabinet includes a cabinet cavity defined by first and second sidewalls connected by a top wall and wherein a majority portion of the first pair of rods are within the cabinet when the first sliding rack is in the stowed position.

18. The mobile cart of claim 13, wherein the first panel is adjacent the cabinet when the first sliding rack is in the stowed position and is spaced from the cabinet when the first sliding rack is in the extended position.

19. A mobile cart comprising:
a cart frame;
a base including a base surface, the base coupled to the cart frame;
a plurality of wheels rotatably attached to the cart frame;
a first container containing a first material;
a second container containing a second material;
a cabinet secured to the base surface and separating the base surface into a first receiving area adjacent the cabinet and a second receiving area adjacent the cabinet opposite the first receiving area;
a first sliding rack moveable between a stowed position at least partially within the cabinet and an extended position in the first receiving area, the first sliding rack adapted to hold a first vessel away from the base surface in the extended position;
a plurality of first receivers coupled to the base in the first receiving area to hold the first container on the base;
a second sliding rack moveable between a stowed position at least partially within the cabinet and an extended position in the second receiving area, the second sliding rack adapted to hold a second vessel away from the base surface in the extended position;
a plurality of second receivers coupled to the base in the second receiving area to hold the second container on the base;
a combination mixer and dispenser releasably secured to the cart frame and having a detachable fluid connection to the first container and the second container for mixing and dispensing the first and second materials;
wherein the first container in the first receiving area prevents the first sliding rack from moving into the extended position and the second container in the second receiving area prevents the second sliding rack from moving into the extended position.

20. The mobile cart of claim 16, further comprising:
a first locking arm coupled to one of the plurality of first receivers to releasably secure the first container to the plurality of first receivers, the first locking arm transferable between a locked configuration and an unlocked configuration; and
a second locking arm coupled to one of the plurality of second receivers, the second locking arm transferable between a locked configuration and an unlocked configuration to releasably secure the second container to the plurality of second receivers.

* * * * *

UNITED STATES PATENT AND TRADEMARK OFFICE
CERTIFICATE OF CORRECTION

PATENT NO.       : 9,457,824 B2
APPLICATION NO.  : 14/990227
DATED            : October 4, 2016
INVENTOR(S)      : Richard I. Moore et al.

Page 1 of 1

It is certified that error appears in the above-identified patent and that said Letters Patent is hereby corrected as shown below:

In the Claims

At Column 14, Line 36 in Claim 20, delete the number "16" and insert the number --19--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*